(No Model.)

G. STRINGER.
FRUIT DRIER.

No. 398,469. Patented Feb. 26, 1889.

WITNESSES:
A. F. Walz
Mark W. Dewey

INVENTOR:
George Stringer
BY
Snell, Laass & Deal
ATTORNEYS.

UNITED STATES PATENT OFFICE.

GEORGE STRINGER, OF AUBURN, NEW YORK.

FRUIT-DRIER.

SPECIFICATION forming part of Letters Patent No. 398,469, dated February 26, 1889.

Application filed May 9, 1888. Serial No. 273,377. (No model.)

*To all whom it may concern:*

Be it known that I, GEORGE STRINGER, of Auburn, in the county of Cayuga, in the State of New York, have invented new and useful Improvements in Fruit-Driers, of which the following, taken in connection with the accompanying drawings, is a full, clear, and exact description.

This invention consists in a novel construction and combination of an evaporating-chamber heated by steam conducted through pipes, which are so distributed in the chamber as to cause the fruit when first introduced into the chamber and when green to be subjected to a high temperature and gradually to a lower temperature during the process of evaporating the said fruit, thus obviating the danger of burning or scorching the fruit or impairing its color and flavor. The chamber being provided with induction-doors and eduction-doors diametrically opposite each other, facilitates the operation of introducing the green fruit into the chamber and removing the cured or dried fruit from the same.

The invention is fully illustrated in the annexed drawings, in which—

Figure 1:
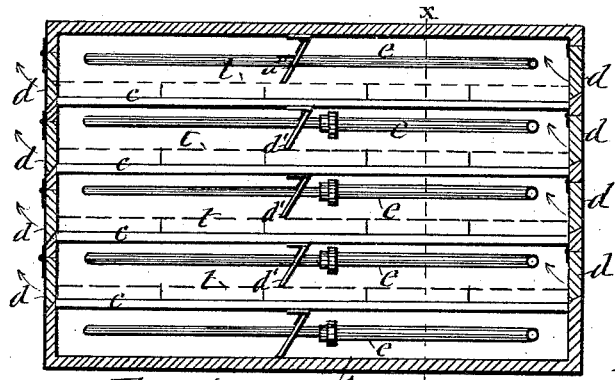
Figure 2:
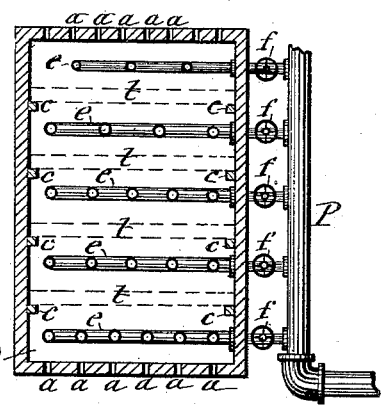
Figure 3:
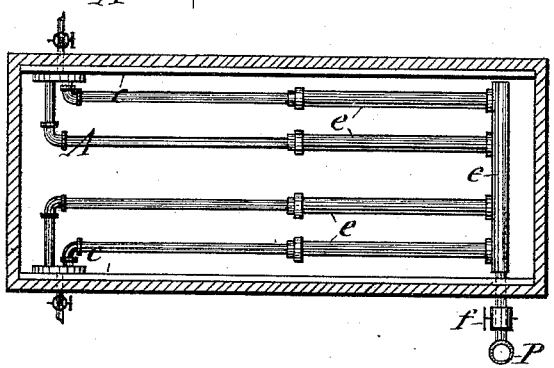
Figure 4:
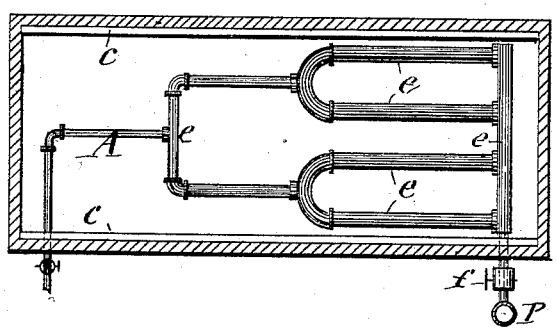
Figure 5:
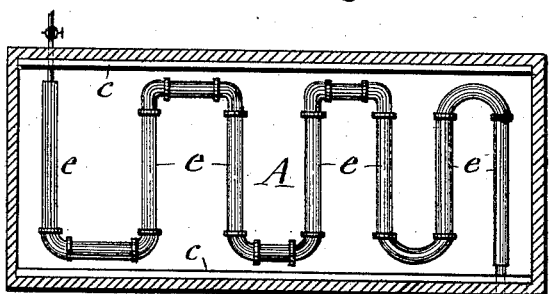

Figures 1 and 2 are respectively longitudinal and transverse vertical sections of a fruit-evaporator embodying my improvements. Figs. 3, 4, and 5 are horizontal transverse sections on line *x x*, Fig. 2, illustrating in various forms the arrangement of the steam-pipes for producing greater heat at the front or induction end of the evaporating-chamber than at the rear or eduction end thereof.

Similar letters of reference indicate corresponding parts.

A denotes the evaporating chamber or case, which is preferably of rectangular form, and is provided at its bottom and top with ventilating or air-inlet and air-outlet ports, *a a*, which may be of the form of slots.

The interior of the chamber or case A has secured to opposite sides at various elevations a series of horizontal cleats, *c c*, extending from end to end of the chamber, which cleats constitute the supports for the trays *t t*, carrying the fruit to be evaporated, said trays being represented by dotted lines in the annexed drawings. The diametrically-opposite ends of the chamber are provided with suspended doors *d d* between the planes of the cleats. The doors at the induction end of the chamber are arranged to swing inward, and those at the opposite or eduction end are arranged to swing outward. The trays being introduced through the inward swinging doors, allows the latter to be pushed open by the trays, and in introducing a tray at one end of the case the tray at the opposite end is pushed out through the outward-swinging door.

*d' d'* are doors or partitions suspended across the central portion of the case for the purpose of keeping the temperature higher in the front portion of the chamber than in the rear portion of the same.

*e e* represent steam-pipes arranged between the planes of the tray-supports *c c*, and receiving steam from a supply-pipe, P, at the end of the chamber A, through which the trays are introduced. By means of valves *f f*, connected to the branches leading from the supply-pipe P to the pipes *e e*, the flow of steam to the latter can be controlled. The pipes *e e* are so distributed as to present greater heat-radiating surfaces at the lower and front portion of the chamber A than at the upper and rear portion thereof. The heat rising from the lower to the upper portion of the chamber compensates for the difference in the heat-radiating surfaces and equalizes the temperature in the chamber.

The green fruit being introduced into the drying-chamber A at the end containing the greatest amount of heat-radiating pipes exposes the green fruit to a high temperature, and in pushing the trays along toward the opposite end of the chamber the fruit is subjected to a lower temperature as the fruit becomes evaporated, and thus the danger of scorching and impairing the color and flavor of the fruit is obviated.

The aforesaid arrangement of the steam-pipes *e e* admits of many modifications, and may consist either in a greater number and larger size of pipes at one end and lower portion of the chamber than at the opposite end and upper portion thereof, as shown in Figs. 1, 2, 3, and 4 of the drawings, or in the employment of a single pipe extended in a serpentine course horizontally through the chamber, and having the successive bends nearer each other in the front portion of the chamber than in the rear portion thereof, as illustrated in Fig. 5 of the drawings.

Having described my invention, what I claim as new, and desire to secure by Letters Patent, is—

1. The combination of the evaporating-chamber provided with tray-supports at various elevations, doors between the planes of the tray-supports and at opposite ends of the chamber, and steam-pipes between the tray-supports and distributed to present greater heat-radiating surfaces at the induction end of the case than at the eduction end thereof, substantially as described and shown.

2. The combination of the evaporating-chamber provided with a perforated bottom and perforated top, tray-supports at various elevations in the said chamber, inward-swinging doors between the tray-supports at one end of the case, outward-swinging doors diametrically opposite the inward-swinging doors, doors suspended across the central portion of the chamber, and steam-pipes between the planes of the tray-supports and distributed to present greater heat-radiating surfaces in the lower portion and the induction end of the chamber than at the upper portion and the eduction end of the chamber, substantially as described and shown.

In testimony whereof I have hereunto signed my name, in the presence of two witnesses, at Auburn, in the county of Cayuga, in the State of New York, this 5th day of May, 1888.

GEORGE STRINGER. [L. S.]

Witnesses:
E. B. MOSHER,
MARK W. DEWEY.